(12) United States Patent
Lind (10) Patent No.: US 8,615,994 B2
(45) Date of Patent: Dec. 31, 2013

(54) ADJUSTABLE HYDRAULIC MASTER CYLINDER ASSEMBLIES

(76) Inventor: Ryan Lind, Newberg, OR (US)

(*) Notice: Subject to any disclaimer, the term of this patent is extended or adjusted under 35 U.S.C. 154(b) by 777 days.

(21) Appl. No.: 12/861,704

(22) Filed: Aug. 23, 2010

(65) Prior Publication Data

US 2012/0042775 A1 Feb. 23, 2012

(51) Int. Cl.
*B60T 11/24* (2006.01)
(52) U.S. Cl.
USPC .............................................. 60/580; 60/594
(58) Field of Classification Search
USPC .............. 60/574, 579, 580, 591, 594; 92/163, 92/169.1
See application file for complete search history.

(56) References Cited

U.S. PATENT DOCUMENTS 5,636,518 A * 6/1997 Burgoyne et al. ............... 60/594
7,377,367 B2 * 5/2008 Takizawa et al. ............ 188/72.9

OTHER PUBLICATIONS

ISR Brakes, Sweden, Master Cylinders Information page, ISR Brakes website page accessed at: http://www.isrbrakes.se/products/mastercylinders/ on Mar. 30, 2011. ISR Brakes, Tumba, Sweden.

Brembo, Radial Master Cylinder 19RCS Information page, Brembo website page accessed at: http://www.brembo.com/ENG/HighPerformance-Brakes/MotoBrakes/Radial+Master+Cylinder+19RCS.htm on Mar. 30, 2011. Brembo S. p.A., Cumo, Italy.

* cited by examiner

*Primary Examiner* — Edward Look
*Assistant Examiner* — Logan Kraft
(74) *Attorney, Agent, or Firm* — Mohr Intellectual Property Law Solutions, PC (57) ABSTRACT

A master cylinder assembly includes a cylinder body, a piston member operably fitted therein, and a pressure valve assembly to establish a variable fluid output upon operation of the piston member. The cylinder body includes two or more pressure chambers to hold hydraulic fluid, each having a transfer port. The piston member includes two or more pistons respectively received in the pressure chambers, and is operable to move the pistons, in parallel, to transfer hydraulic fluid through the transfer ports. The pressure valve assembly includes a selector and is operable to direct fluid transferred through selected transfer ports out of the cylinder body through an outlet port by means of a movable valve member that establishes a passageway communicating the selected transfer ports with the outlet port. A pivot adjustment mechanism allows adjustment of the lever's mechanical advantage, and a stroke adjustment mechanism allows adjustment of the lever's rest position.

18 Claims, 6 Drawing Sheets

ADJUSTABLE HYDRAULIC MASTER CYLINDER ASSEMBLIES

TECHNICAL FIELD

The disclosure relates to hydraulic master cylinder assemblies, and in particular hand-operated master cylinder assemblies for motorcycles.

BACKGROUND

In general, a hydraulic master cylinder assembly, such as for a clutch or a brake, includes a cylinder body with a bore that slidably receives a piston, and an actuating mechanism to effect axial movement thereof in response to operation of the actuating mechanism, to deliver a hydraulic operating force. In a brake master cylinder, such as for a motorcycle, the actuating mechanism generally includes a hand-operated lever mounted on the handlebar of the motorcycle, with the lever biased away from the handle in its rest position. The motorcyclist grips the handle along with the lever and closes his/her hand to move the lever toward the handle. The lever is typically operably coupled to the piston, such that the manner of movement of the lever, in terms of how far the lever is moved (i.e., the lever stroke), how rapidly the motorcyclist moves the lever through a stroke, and so forth, often determines the nature of the hydraulic operating force and the response of the brake thereto.

Motorcyclists often desire to adjust characteristics of the brake levers, such as to more comfortably accommodate the motorcyclist's hand size, for example by moving the at-rest position of the lever relative to the handle, to exhibit a desired amount of resistance against being pulled toward the handle, for example by changing the mechanical advantage of the lever, and so forth. In general, such characteristics are adjusted by a mechanic when the motorcycle is not being ridden.

Motorcyclists also often desire to adjust the responsiveness of their brakes to operation of the brake levers. This is sometimes accomplished by choosing a master cylinder of a particular size, which is often described in terms of the diameter of the bore in which the piston operates. Manufacturers offer a range of master cylinders having differing bore diameters, for example to suit variations among motorcycles, such as hydraulic system capacity, vehicle weight, brake type, brake pedal ratio, and so forth. Such cylinders are usually offered in a range of standard bore sizes. However, in some applications, such as in motorcycle racing, a racing team may utilize a number of cylinders of different sizes for a single motorcycle, such as to accommodate different circuits, different weather conditions, and variations in rider technique. Changing a master cylinder, however, requires significant time and careful effort, and in general is an operation that cannot be performed when the motorcycle is in use.

SUMMARY

Illustrative embodiments of an adjustable output master cylinder assembly are disclosed. A master cylinder assembly according to this disclosure may be adjusted to deliver a hydraulic force within a range corresponding to that delivered by a range of master cylinders of different bore sizes. Moreover, this adjustment may be performed by a motorcyclist while operating the motorcycle. Some embodiments further include other in-use adjustment mechanisms, such as to allow an operator to adjust the mechanical advantage of the brake lever, and/or the lever stroke. As such, the master cylinder assembly of the present disclosure allows a motorcyclist several in-use adjustment means to achieve a desired "feel" to suit the ride's technique.

Illustrative embodiments of a master cylinder assembly as shown and described herein includes a cylinder body, a piston member operably fitted for slidable movement therein, and a pressure valve assembly adapted to establish a variable fluid output upon operation of the piston member. The cylinder body has an inlet and an outlet port, and defines a cylinder chamber adapted to communicate via the inlet port with a fluid reservoir and to hold hydraulic fluid therefrom. The cylinder chamber includes two or more pressure chambers each having a transfer port. The piston member includes two or more pistons received, respectively, in the pressure chambers, and is operable to move the pistons, in parallel, to thereby transfer hydraulic fluid in the pressure chambers through their respective transfer ports. The pressure valve assembly is operable to selectively direct the hydraulic fluid transferred through at least one of the transfer ports out of the cylinder body through an outlet port.

In some embodiments, the piston member includes a main piston and a plurality of supplementary pistons, and the cylinder chamber correspondingly defines a main pressure chamber and a plurality of supplementary pressure chambers, in which the main and supplementary pistons are received. In some embodiments, the cylinder body further defines a valve chamber that includes a number of supply ports communicating with the transfer ports of the supplementary pressure chambers, with the transfer port of the main pressure chamber communicating directly with the outlet port. In such embodiments, the pressure valve assembly includes a selector adapted to select one or more of the supply ports, and a pressure valve operable to establish a passageway communicating the selected supply ports with the outlet port. In some embodiments, successive selection of one or more supply ports may allow a user to incrementally adjust the fluid output directed through the outlet port to a brake. In such embodiments, the supplementary pistons, and their corresponding bores, may be sized such that the fluid output of the master cylinder assembly may define a range of fluid output equivalent to that delivered by a series of master cylinders having a corresponding size range.

In some embodiments, the master cylinder assembly includes mounting means for mounting the cylinder body in a fixed position relative to a handle, and a supporting member to which a transverse lever is pivotably mounted. In such embodiments, the piston member includes a piston rod extending out of the cylinder body, with its distal end operably coupled to the lever at a point on the lever distal of the pivot axis, such that pivotal movement of the lever exerts a pushing force to operate the piston member. In some embodiments, the distal end of the lever includes an elongated slot having a longitudinal axis transverse to the pivot axis, and a pivot member, which pivots on the pivot axis, is captured for slidable movement along the longitudinal axis of the slot. Such embodiments may include a pivot adjustment mechanism adapted to allow a user to adjust the mechanical advantage of the lever by sliding the pivot member within the slot.

Further, some embodiments include a stem member held in a bore formed through the distal end of the lever, the stem member defining a second pivot axis parallel to that of the pivot member, with the distal end of the piston rod threaded through a transverse bore through the body of the stem member. The stem member may thus be adapted to translate pivotal movement of the lever about the pivot axis into a pushing force on the piston rod to operate the piston member. Some embodiments may further include biasing means adapted to bias the lever away from the cylinder body and into a start position. Such embodiments may further include a stroke adjustment mechanism adapted to allow a user to move the stem member along the piston rod to thereby adjust the start position of the lever.

DETAILED DESCRIPTION

In the drawings, an illustrative and non-limiting embodiment of an adjustable output hydraulic master cylinder assembly for a vehicle, in accordance with aspects of the invention as set forth in the claims, is indicated generally at 10. For convenience, the illustrated embodiment of the master cylinder assembly 10 is shown and explained to operate in connection with a motorcycle brake, but the master cylinder assembly described herein may be used with other vehicles, such as bicycles, mopeds, ATVs, and the like, or may be adapted for use with a clutch system in such vehicles.

Figures 1, 4:
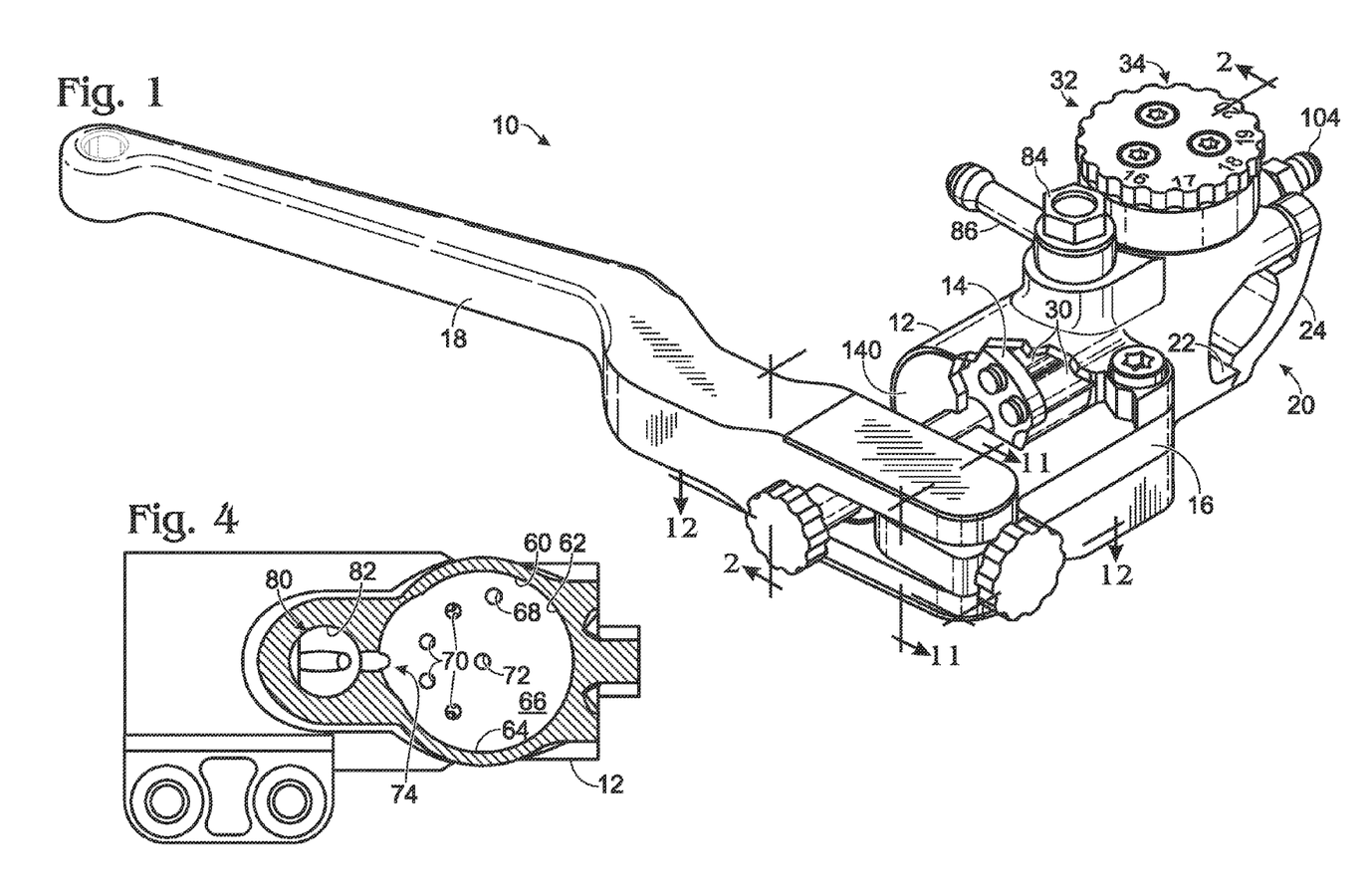
FIG. 1 is a three-dimensional view of an illustrative and non-limiting embodiment of an adjustable output hydraulic master cylinder assembly, with portions of the piston stop and the exterior surface of the cylinder body partially cut away to show the piston member situated therein.
FIG. 4 is a cross-sectional view of the cylinder body of FIG. 1, taken along the line 4-4 of FIG. 3.

As shown in FIG. 1, the master cylinder assembly 10 includes a cylinder body 12 slidably supporting a piston member 14 therein, a supporting member 16 extending therefrom, and an elongate transverse lever 18 pivotably mounted to the supporting member and operably coupled to the piston member 14. Cylinder body 12 further includes a mounting means 20 for mounting the cylinder body in a fixed position relative to a handle (not shown), in the form of a seat portion 22 formed on the cylinder body and a handle clamp 24 removably secured thereto.

Briefly, cylinder body 12 is adapted to hold hydraulic fluid, such as supplied from a fluid reservoir (not shown). By pulling lever 18 toward the handle, a user, such as a motorcyclist, operates the piston member 14, which transfers hydraulic fluid under pressure from the cylinder body to a brake (not shown).

As explained in further detail herein, piston member 14 includes a plurality of pistons 30 slidably fitted in corresponding pressure chambers within the cylinder body 12. Master cylinder assembly 10 further includes a pressure valve assembly 32 adapted to provide a variable fluid output from the master cylinder assembly, by allowing a user, by means of a selector 34, to selectively direct hydraulic fluid transferred by one or more of the pistons 30 from the cylinder body.

In the following description, orientational and directional terms such as "horizontal," "vertical," "forward," "rearward," "top," "bottom," and so forth, are used for clarity of illustration and generally refer to the relative position of components shown in the drawings, but are not intended to be limiting, as the master cylinder assembly (and components thereof) is not restricted to the orientations and positions shown in the drawings.

Figure 2:
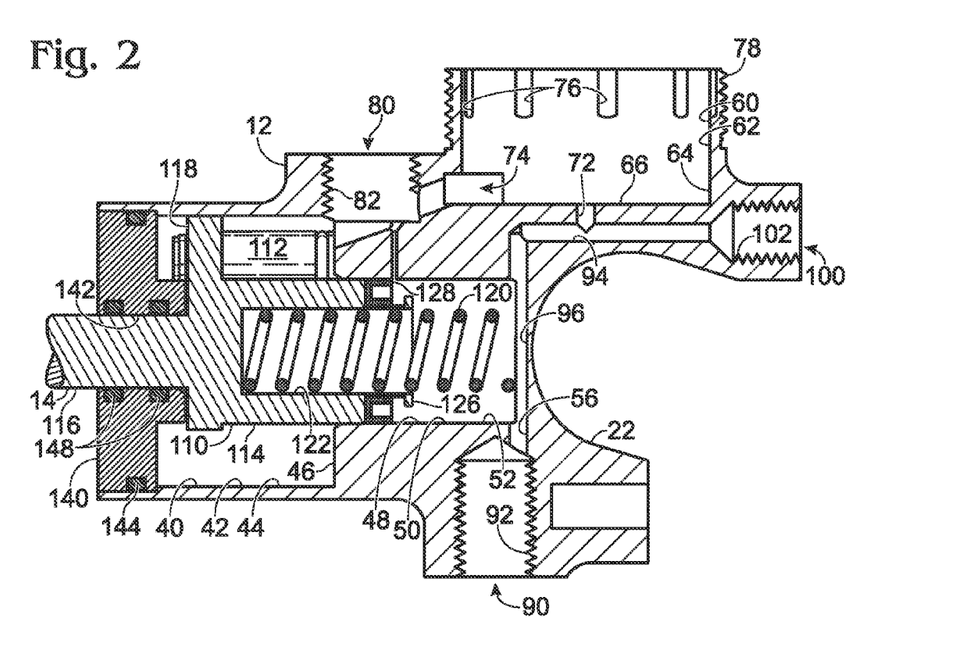
FIG. 2 is a cross-sectional view of the cylinder body, piston member, and piston stop of the master cylinder assembly of FIG. 1, taken along the line 2-2 of FIG. 1.
Figure 3:
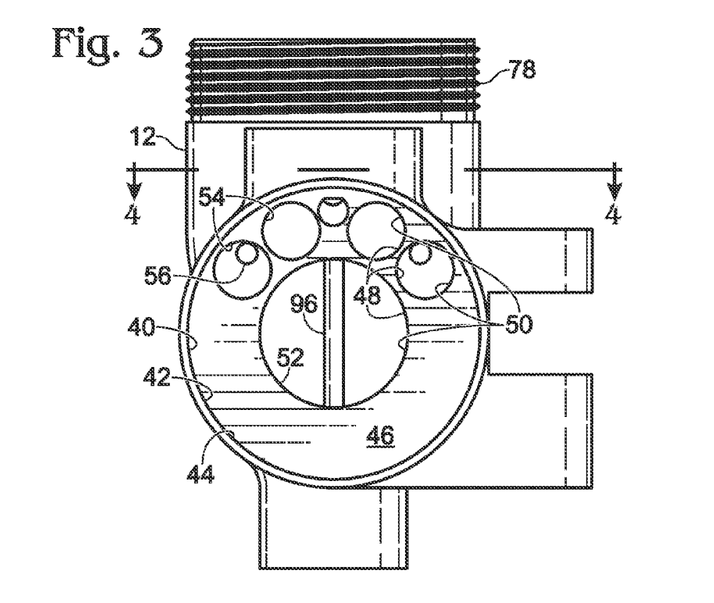
FIG. 3 is a front view of the cylinder body of FIG. 1.

As can be seen in FIGS. 2 and 3, cylinder body 12 is approximately L-shaped, having a first open bore 40 longitudinally formed therein to define a cylinder chamber 42, generally bounded by a cylindrical side wall 44 and a flat rear wall 46. Rear wall 46 itself includes several smaller-diameter bores 48 extending further into the cylinder body, defining a number of pressure chambers 50. In the illustrated embodiment, pressure chambers 50 include a main pressure chamber 52 that extends coaxially from the cylinder chamber and four supplementary pressure chambers 54 arranged, fan-like, around a portion of the rear wall, each having a longitudinal axis parallel to that of the main pressure chamber 52. Although not all are visible in the drawings, each pressure chamber 50 is provided with a transfer port 56.

A second open bore 60 vertically formed in the top portion of cylinder body 12 defines a valve chamber 62, generally bounded by a cylindrical side wall 64 and a flat chamber floor 66. With reference to FIG. 4, a bore 68 and several ports are shown to be disposed on chamber floor 66, including four supply ports 70, and a delivery port 72. In the illustrated embodiment, delivery port 72 is shown to be in the approximate center of the circular chamber floor 66, with supply ports 70 and bore 68 arranged in an arc approximately intermediate the delivery port 72 and the side wall 64, spaced from each other at 40-degree intervals. In the illustrated embodiment, the transfer ports 56 of the four supplementary pressure chambers 54 are in fluid communication, such as via respective passageways (not shown) through the cylinder body, with the four supply ports 70.

Referring again to FIG. 2, the cylinder body includes an inlet port disposed in the top portion of the cylinder body, and designated generally at 80. As shown in the illustrated embodiment, the inlet port is defined by a bore 82 having a smaller diameter than, and extending into the cylinder body parallel to, the bore defining valve chamber 62. Although shown as a threaded, cylindrical bore, the physical configuration of bore 82 may be as desired to fluidly communicate the inlet port with a fluid reservoir, such as via a banjo bolt 84 and an inlet shaft 86, as shown in FIG. 1. Hydraulic fluid from a fluid reservoir may be supplied, through inlet port 80, to cylinder chamber 42 and main pressure chamber 52, via appropriate fluid passageways connecting the inlet port with the cylinder chamber and main pressure chamber.

Inlet port 80 also fluidly communicates with valve chamber 62 via a return port 74 in the valve chamber. In the illustrated embodiment, return port 74 is formed by a recessed portion of the interior surface of cylindrical wall 64, near the chamber floor 66. The interior surface of cylindrical wall 64 is also shown to include five vertical channels 76 extending about halfway down the height of the wall 64 from the top edge thereof, and with the channels disposed radially around a portion of the interior surface at 40-degree intervals. The exterior surface 78 of cylindrical wall 64 is shown to be threaded.

Cylinder body 12 further includes an outlet port, designated generally at 90, and shown in the illustrated embodiment to be defined by a cylindrical bore 92 extending upward into the cylinder body from a bottom exterior surface thereof. Again, the physical configuration of bore 92 may be as desired to fluidly communicate the outlet port with a brake device (not shown), such as via appropriate connectors and fluid lines.

Inside cylinder body 12, outlet port 90 fluidly communicates with main pressure chamber 52 via its transfer port 56, and with valve chamber 62 via delivery port 72. More particularly, as shown in the illustrated embodiment, delivery port 72 leads to a passageway 94 that connects with the main pressure chamber. Passageway 94 continues downward through the main pressure chamber as an open groove 96 recessed into the rear wall of the main pressure chamber, then leads to outlet port 90.

Finally, cylinder body 12 in the illustrated embodiment is shown to include a bleed port 100 defined by a bore 102, which also may be configured as desired, for example to accept an appropriate connector, such as a bleeder valve 104 (shown in FIG. 1) that may be adapted to allow purging the hydraulic fluid of air bubbles, and/or flushing or replacing the hydraulic fluid in the master cylinder assembly 10.

Figures 5, 9:
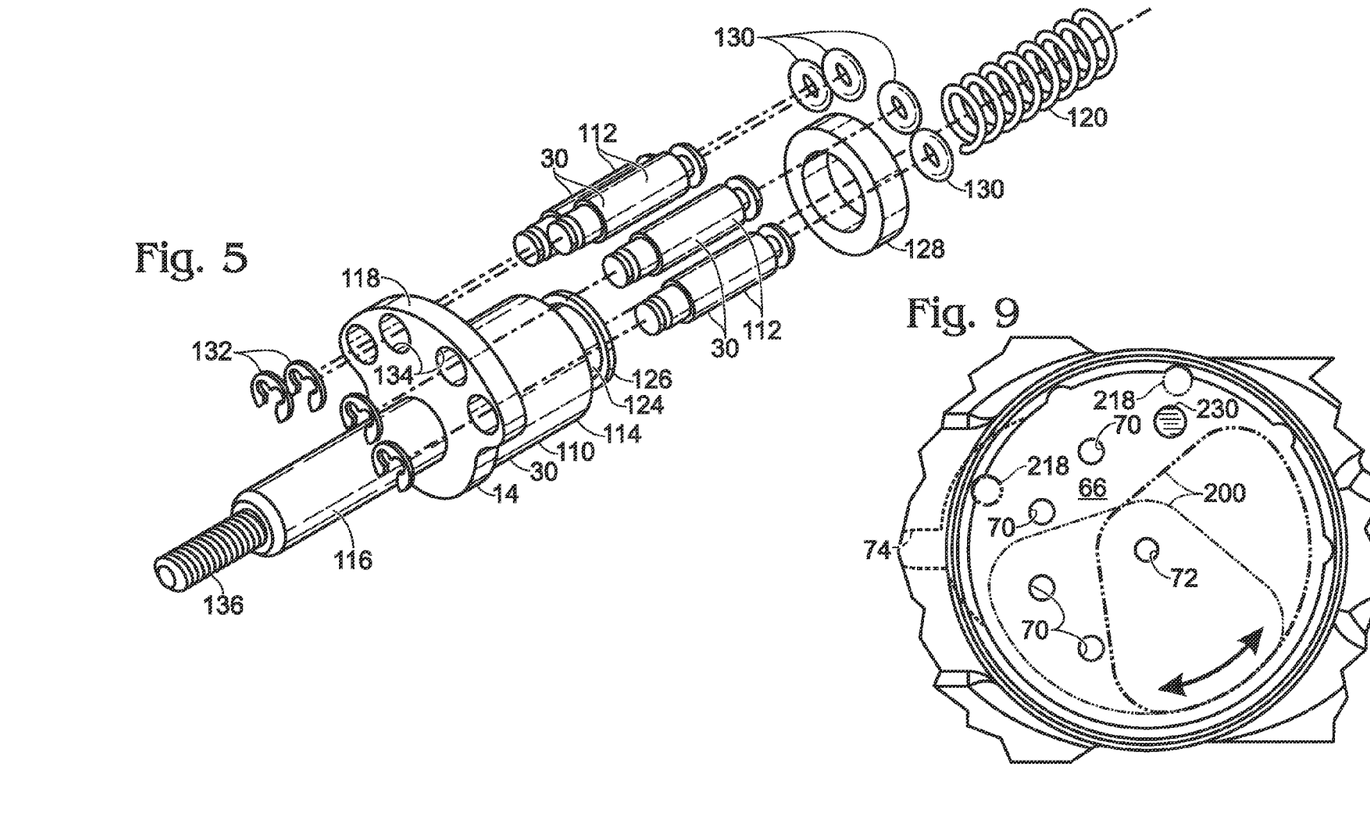
FIG. 5 is an exploded view showing components of the piston member of FIG. 1.
FIG. 9 is a top view of a portion of the cylinder body of FIG. 2, showing the valve chamber and a schematic representation of the pressure valve superimposed thereon.

As shown in FIGS. 1 and 2, piston member 14 is slidably fitted within the cylinder chamber. FIG. 5 shows an exploded view of components of piston member 14 according to the illustrated embodiment, including a number of pistons 30. As shown, pistons 30 include a main piston 110 and four supplementary pistons 112. Main piston 110 further includes a cylindrical piston shaft 114, an elongate piston rod 116 extending longitudinally rearwardly therefrom, and a flange 118 extending radially from the piston shaft. The piston shaft carries a biasing member in the form of a compression spring 120 in a bore 122 formed therein, and is also configured, via an annular groove 124 and a retaining lip 126 formed at its distal end, to retain a U-cup seal 128.

As shown, flange 118 is approximately shaped as a partial disc that is coaxial with the piston shaft. The flange supports the supplementary pistons 112 to extend generally forwardly therefrom, with each in a spaced relation with, and parallel to, the shaft of the main piston. Each supplementary piston 112 carries, at its distal end, an O-ring 130. As shown in the illustrated embodiment, the supplementary pistons are each floating pistons, held via corresponding retaining clips 132 in respective bores 134 formed in the flange 118; however, the supplementary pistons alternatively may be fixed pistons.

Piston rod 116 at its proximal end is rigidly affixed to the piston shaft, and in the illustrated embodiment is formed as a unitary body together therewith, but in alternative embodiments may be operably coupled thereto by any suitable means. At its distal end, the piston rod features a threaded portion 136.

As shown in FIGS. 1 and 2, piston member 14 is fitted for slidable movement within the cylinder chamber 42 defined by the first open bore 40, which is sealed at its open end by a piston stop 140 having a central bore 142 through which the distal end of the piston rod 116 extends. The illustrated embodiment is shown in FIG. 2 to include an O-ring 144 held in an external annular groove of the piston stop, and two O-rings 148 held in respective internal annular grooves, collectively completing the seal between the exterior and interior edges of the piston stop and, respectively, the cylindrical side wall of the open bore 40 and the surface of the piston rod 116.

So fitted, the pistons 30 of the piston member are arranged to be received within the respective pressure chambers 50. In particular, the piston shaft 114 of main piston 110 is received for slidable movement in main pressure chamber 52, and each of the supplementary pistons 112 are likewise received for slidable movement in corresponding supplementary pressure chambers 54. At rest, the piston shaft 114 is urged, via compression spring 120, together with any resistive force from the hydraulic fluid in the cylinder chamber, outward to abut the piston stop 140.

In light of the foregoing, it is clear that an operating force delivered to the piston member, such as via the piston rod, moves the pistons as a unit and in parallel, within the corresponding pressure chambers, thereby transferring hydraulic fluid held therein through the transfer port of each pressure chamber. More specifically, in the illustrated embodiment, hydraulic fluid in the main pressure chamber is transferred by the main piston through its transfer port to the outlet port, and hydraulic fluid in each of the supplementary chambers is transferred by the corresponding supplementary piston through its transfer port to the respective supply ports in valve chamber 62.

As noted briefly above, pressure valve assembly 32 is adapted to provide a variable fluid output from the master cylinder assembly. In the illustrated embodiment, this is accomplished by selectively directing the hydraulic fluid transferred to the valve chamber 62, via the supply ports, to the delivery port, by establishing a passageway communicating one or more selected supply ports with the delivery port. In this manner, hydraulic fluid transferred by the supplementary pistons 112 corresponding to the selected supply ports 70, together with hydraulic fluid transferred by the main piston 110 through its transfer port, may be directed through the outlet port 90. The variable nature of the fluid output is thus determined by the number of supply ports selected.

Figures 6, 7, 8:
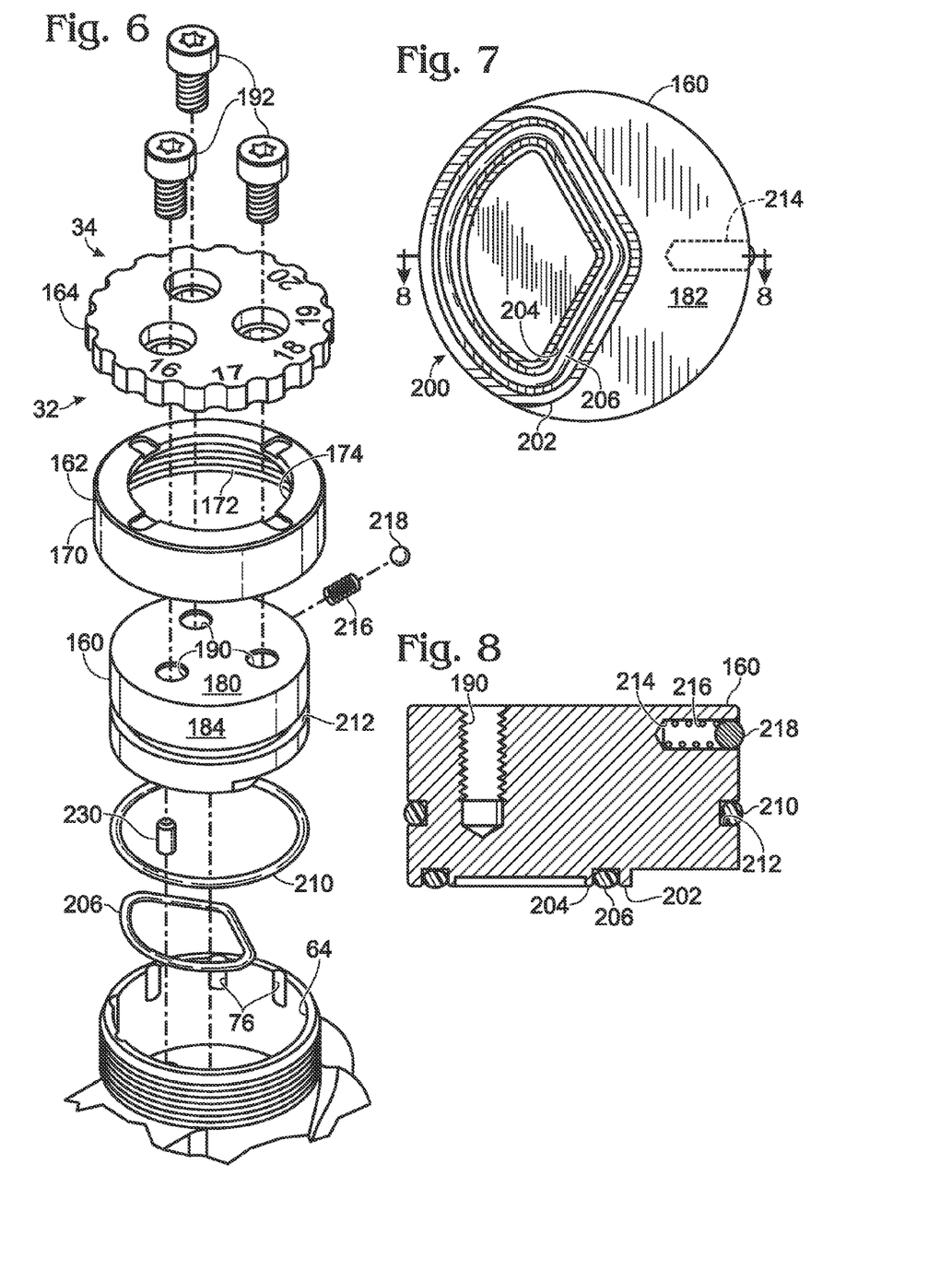
FIG. 6 is an exploded view showing components of a pressure valve assembly of the master cylinder assembly of FIG. 1, and how the pressure valve assembly is received into a bore defining a valve chamber in the cylinder body.
FIG. 7 is a bottom view of the pressure valve of FIG. 6.
FIG. 8 is a cross-sectional view of the pressure valve of FIG. 6, taken along the line 8-8 of FIG. 7.

FIG. 6 shows the components of the pressure valve assembly 32 of the illustrative embodiment. The pressure valve assembly includes a generally cylindrically-shaped pressure valve 160, a valve retaining nut 162, and the selector 34, in the form of an indexing cap 164. Valve retaining nut 162 is formed by a cylindrical wall 170 that has an interior threaded surface 172, and which defines an opening having a diameter large enough to concentrically receive the top portion of pressure valve 160. A lip 174 extends inwardly from wall 170 and defines a circular opening having a diameter smaller than the diameter of a top face 180 of pressure valve 160.

With additional reference to FIGS. 7 and 8, pressure valve 160 can be seen to additionally include a bottom face 182 and an exterior cylindrical surface 184. The top face 180 includes threaded holes 190 configured to receive screws 192, to secure selector 34 against the top face. The bottom face 182 of the pressure valve features a valve member 200, shown to be formed by a concentric pair of ridges 202, 204 that extend from the flat surface of the bottom face to define a continuous channel therebetween, in which an O-ring 206 is fitted. Valve member 200 thereby bounds an area of the bottom face of the pressure valve that is shaped, approximately, like a circular sector with radiused corners. Another O-ring 210 is fitted in an annular groove 212 formed in the exterior cylindrical surface of pressure valve 160, which also features a small bore 214 in which is received a valve spring 216 and a ball bearing 218.

The pressure valve assembly 32 is assembled by threading the valve retaining nut onto the correspondingly threaded exterior surface 78. O-ring 210 maintains the pressure valve 160 concentrically positioned within the valve chamber 64 and thereby seals it, while allowing rotation of the pressure valve (relative to valve retaining nut 162 and cylinder body 12) by turning the indexing cap 164. So assembled, the bottom face 182 of the pressure valve is spaced from the chamber floor 66 by means of valve member 200, which is urged against the chamber floor. Thus, valve member 200 (specifically, in the illustrated embodiment, O-ring 206) seals and defines a smaller volume, between the portion of the bottom face 182 of the pressure valve and the portion of the chamber floor encompassed thereby. This volume is referred to herein as a "delivery volume."

The valve member, and thus its associated delivery volume, is movable relative to the chamber floor when the pressure valve is rotated. FIG. 9 schematically illustrates this movable interface. For simplicity, valve member 200 is represented as a single-line outline superimposed, in two different positions, on the chamber floor 66. The outline may thus represent the approximate position of the surface of the O-ring 206 that is urged against the chamber floor 66 in each of the positions shown. As such, the area bounded by the outline represents the delivery volume defined by the valve member.

The valve member 200 is shown in two illustrative positions relative to the chamber floor, indicated as two different types of dashed lines. In a first position, the delivery volume encompasses the delivery port 72, but none of the supply ports 70; thus, the first position is one in which none of the supply ports are selected. In the second position, two supply ports 70 are selected, as indicated by the delivery volume encompassing the delivery port 72 and the lower two of the supply ports 70. In this manner, the selector (not shown) is operable to select one or more supply ports by slidably moving the valve member relative to the chamber floor, as generally indicated by the arrow in FIG. 9, so that the delivery volume encompasses the selected supply ports. In particular, rotating the index cap 164 rotates the pressure valve 160, and thus the valve member 200, into a position in which no supply ports, or one or more supply ports, are encompassed by the delivery volume.

In the illustrative embodiment, the delivery port 72 is encompassed by the delivery volume in any position of the valve member 200. As such, the delivery volume establishes a passageway fluidly communicating any selected supply ports 70 with the delivery port 72.

Furthermore, any supply ports 70 that are not selected are outside of the delivery volume, but are within the sealed volume of the valve chamber, and accordingly are in fluid communication with the return port 74.

It is clear from the above description that in the illustrated embodiment, the delivery volume may be moved into other positions not shown in FIG. 9, including positions encompassing one, three, or all four supply ports.

As explained above, operating the piston member 14 results in hydraulic fluid transfer by the pistons 30 as follows: the main piston 110 transfers hydraulic fluid from the main pressure chamber through its transfer port to the outlet port 90, and each supplementary piston 112 transfers hydraulic fluid from its respective supplementary pressure chamber through its transfer port to a corresponding supply port 70 in the valve chamber.

The pressure valve assembly thus directs hydraulic fluid from any selected supply ports 70 to the delivery port 72, and fluid from any supply port 70 that is not selected is directed to the return port 74. Upon operation of the piston member 14, then, the fluid output at the outlet port 90 thus consists of the fluid transferred by the main piston, together with that transferred by the supplementary pistons corresponding to the selected supply ports 70. This fluid output is therefore variable, depending on the number of supply ports (and, correspondingly, supplementary pistons) selected.

Although not required to all embodiments, the arrangement of the supply ports 70 and the configuration of the valve member 200 in the illustrative embodiment allows sequential and cumulative selection of the four supply ports. In particular, in the illustrated embodiment, rotating the pressure valve in 40-degree intervals from the first position of the valve member 200 results in the successive selection of one, two, three, and then all four supply ports 70. As such, the fluid output upon operation of the piston member incrementally increases upon successive and sequential selection of the supply ports. Accordingly, the variable fluid output at the outlet port ranges between a minimum fluid output corresponding to the fluid transferred only by the main piston when no supply ports are selected, and a maximum fluid output corresponding to the fluid transferred by the main piston together with all of the supplementary pistons when all of the supply ports are selected.

The pistons, and/or the pressure chambers in which the pistons operate, may be configured to deliver a desired fluid output range, defined in desired increments. Fluid output is proportional to the diameter of the bore defining the chamber in which a piston moves, which may therefore be used as an approximate measure of fluid output.

Using this convention, an example bore size range may be described with reference to the illustrated embodiment. In the example bore size range, the main pressure chamber has a bore diameter of 16 mm, and each of the supplementary chambers are sized such that when sequentially selected, each contributes the equivalent of an additional 1 mm to the effective fluid output. In other words, using the selector to select the first supply port combines the fluid transferred by the main piston with that transferred by the corresponding supplementary piston, resulting in a fluid output at the outlet port equivalent to that delivered by a master cylinder having a 17 mm bore diameter. Moving the pressure valve to select the next supply port, such that the first two are selected, results in a fluid output at the output port equivalent to that delivered by a master cylinder having a 18 mm bore diameter, and so forth, such that when all four supply ports are selected, the fluid output at the outlet port is equivalent to that delivered by a master cylinder having a 20 mm bore diameter.

Continuing this example bore size range, calculating the diameter, or bore size, for each supplementary pressure chamber so that the aforementioned example fluid output range is realized may be done as follows. To calculate the first bore size, the cross-section area of the 16 mm bore is subtracted from that of a 17 mm bore, and the difference is converted into a diameter for the first bore, rounded to a desired degree of precision. The second bore size is calculated by adding the cross-section area of the 16 mm bore to that of the first bore, subtracting this sum from the cross-section area of an 18 mm bore, and converting the difference into a (rounded) diameter for the second bore. Similar calculations may be performed to determine the bore size for the third and fourth bore sizes. The diameters of the supplementary pistons may then be calculated by subtracting a desired clearance amount (for example, a clearance of 0.005 in. is used in the illustrated embodiment) from each bore size. The following table shows the bore and corresponding piston diameters for the four supplementary pressure chambers 54 of the illustrated embodiment to achieve this example fluid output range:

|  | bore diameter (in.) | piston diameter (in.) |
| --- | --- | --- |
| first bore | .226 | .221 |
| second bore | .233 | .228 |
| third bore | .2395 | .2345 |
| fourth bore | .246 | .241 |

Using these principles, any desired bore size range, such as to achieve a desired fluid output range, may be achieved.

Although not required to all embodiments, the pressure valve assembly 32 may further include an indexing mechanism configured to releasably retain the valve member in any of the aforementioned positions. In the illustrated embodiment, the indexing mechanism consists of the spring-biased ball bearing 218 within the small bore 214 in the exterior surface of the pressure valve 160. The ball bearing seats into one of the vertical channels 76 in the cylindrical wall of the valve chamber when the pressure valve 160 is rotated into a position corresponding to the selection of one or more of the supply ports, or no supply port. For example, FIG. 9 shows, using the two different types of dashed lines that are also used to show the two different positions of the valve member 200, the ball bearing 218 seated into each of two channels 76. In particular, when the valve member 200 is in the first position (corresponding to the selection of no supply ports 70), the ball bearing 218 is seated in the left-most of the channels 76. Rotation of the indexing cap 164 (and corresponding rotation the pressure valve) to place the valve member 200 in the second position (corresponding to the selection of the first two supply ports 70) moves the ball bearing along the interior wall to seat in the middle of the channels 76, and so forth.

Further, although not required to all embodiments, the pressure valve assembly may include visual indicia indicating which position in which the valve member is placed. Consistent with the example bore size range discussed above, indexing cap 164 of the illustrated embodiment is shown to be provided with indicia in the form of integers ranging from 16 to 20, such as to allow a user a visual indication of the effective fluid output of the master cylinder assembly when the pressure valve is retained in a particular position. In particular, the indicia "16" indicates that the effective fluid output is equivalent to a master cylinder having a 16 mm bore size, and corresponds to the first illustrated position of the valve member 200 shown in FIG. 9, in which no supply ports are selected, and in which, accordingly, the fluid output corresponds only to that of the main piston. The second illustrated position of the valve member 200 shown in FIG. 9 accordingly corresponds to the indicia "18," to indicate that the effective fluid output is equivalent to that delivered by a master cylinder having an 18 mm bore size, by delivering the hydraulic fluid transferred by the main piston together with that of the supplementary pistons corresponding to the two selected supply ports.

Also, although not required to all embodiments, the pressure valve assembly 32 may incorporate a mechanism to limit the range of movement of the pressure valve 160 and/or valve member 200. In the illustrated embodiment, a pin 230 received in a bore 68 in chamber floor 66 extends upward therefrom and functions as a stop: rotation of the piston member beyond a certain point in either direction is prevented when the outer ridge 202 of the valve member 200 abuts the pin.

As such, in the illustrated embodiment, the pressure valve assembly permits a user, by means of rotating the indexing cap 164, to adjust the effective fluid output of the master cylinder assembly from a minimum fluid output corresponding to that of a 16 mm master cylinder to a maximum fluid output corresponding to that of a 20 mm master cylinder, by sequential and cumulative selection of the supply ports. Further, the indexing mechanism allows the pressure valve, and thus the valve member, to be indexed and releasably retained through a range of predefined positions that correspond to the selection of none of the supplementary pistons through all of the supplementary pistons. In the illustrated embodiment, when mounted to a motorcycle handlebar, the indexing cap 164 is located proximate the handle, so that a motorcyclist may adjust the fluid output of the master cylinder assembly 10 to a desired level while operating the motorcycle.

It is clear from the above explanation that many aspects of the master cylinder assembly 10 could be modified, such as to provide any desired fluid output range, utilizing the concepts as disclosed herein. For example, alternative embodiments may include a different number of supplementary and/or main pistons, and a correspondingly different number and/or arrangement of respective supply ports in the valve chamber, relative to the numbers, arrangements, and/or configurations of these components as shown in the illustrated embodiment. Such alternative configurations may be selected in order to provide a fluid output range having minimum and/or maximum fluid outputs different from those in the example fluid output range illustrated above, and/or a range that is incremented in different intervals, either regular or irregular, or a combination of regular and irregular, or having intervals of a nature that the range is effectively continuous, rather than discrete. For example, the bore and piston sizes may be varied, such as to provide different increments and/or different ranges of fluid output adjustment. Optionally, the pressure valve and/or valve member in alternative embodiments may be configured such that different combinations of supply ports may be selected in each of a plurality of positions, in non-sequential and/or non-cumulative orders. Alternative embodiments may further incorporate multiple or otherwise different iterations of the disclosed components above, such as more than one selector, more than one valve chamber, and so forth, or fewer than the disclosed number of components. For example, an alternative embodiment having a comparatively simple configuration relative to that shown in the illustrative embodiment may include two pistons, either one (and/or both) of which may be selected by the selector. On the other hand, an alternative embodiment having a more complex configuration may include multiple piston members each with different combinations of main and supplementary pistons, and so forth. Such variations are considered to be within the scope of this disclosure.

Operation of the piston member 14 may be by any suitable means. In the illustrated embodiment, as shown in FIG. 1, supporting member 16 extends from a side of cylinder body 12, and lever 18 is transversely mounted to a distal end thereto for pivotal movement about an axis approximately perpendicular to the longitudinal axis of the cylinder body. Lever 18 is operably coupled to the distal end of the piston rod 116 of piston member 14, such that pivoting the lever exerts a pushing force on the piston rod to operate the piston member.

Figure 10:
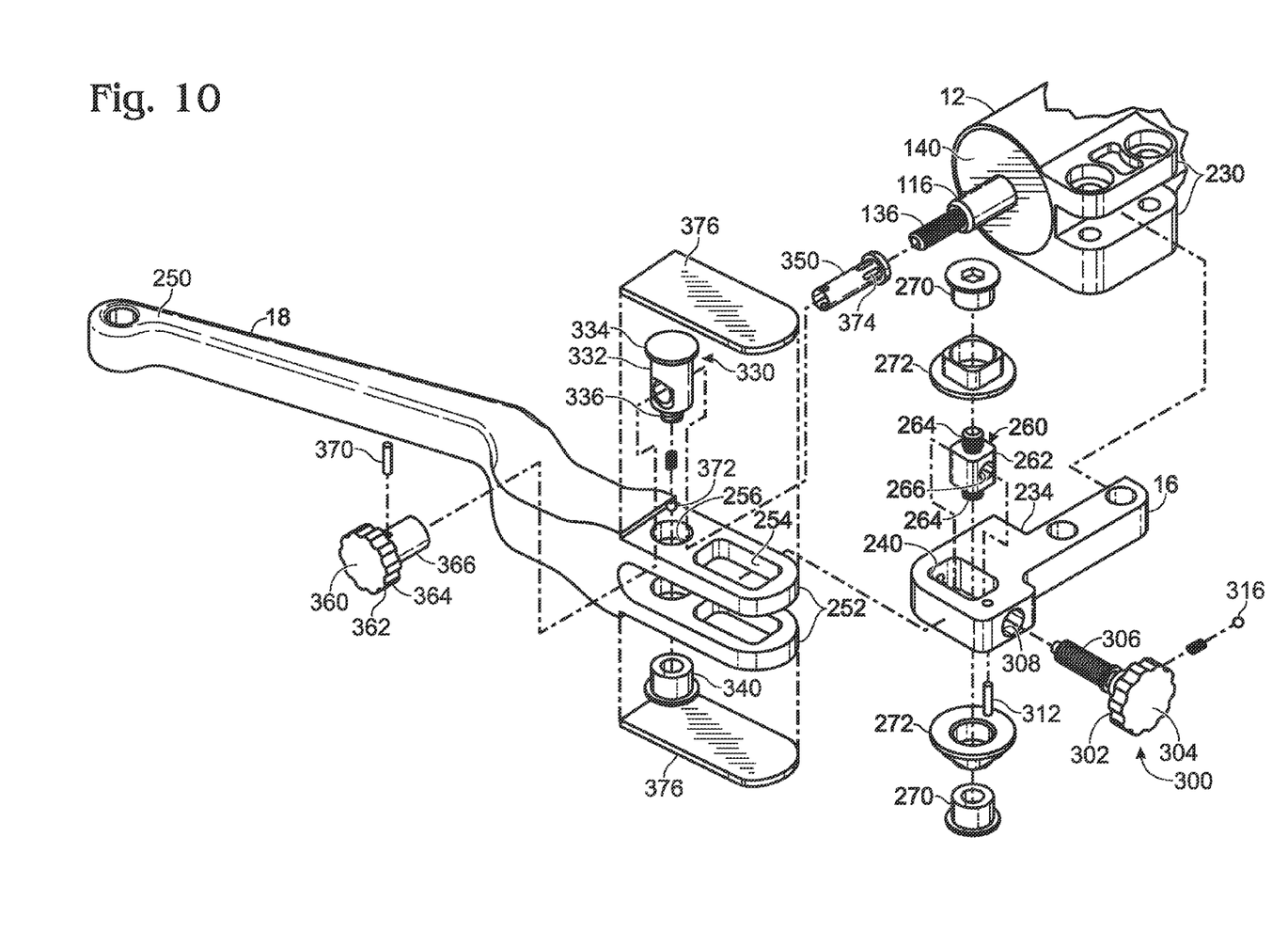
FIG. 10 is an exploded view of components of the master cylinder assembly of FIG. 1, including the lever, the portion of the piston member to which the lever is operably coupled, the supporting member to which the lever is pivotably mounted, and related components.

FIG. 10 is an exploded view of selected components of the illustrated embodiment, including a portion of cylinder body 12, piston rod 116 extending therefrom, supporting member 16, lever 18, and various coupling structure. Cylinder body 12 is shown to form a pair of bracket members 230 that protrude from the exterior surface thereof and that are sized to receive a proximal end of supporting member 16, which is secured therebetween by means of screws (not shown). The distal end of the supporting member includes a ledge portion 234 that seats against piston stop 140, thereby assisting to secure the piston stop in place within the first open bore to seal the cylinder chamber formed therein. The distal end of the supporting member 16 also forms an elongated slot 240, which has a longitudinal axis transverse to that of the supporting member.

Figure 11:
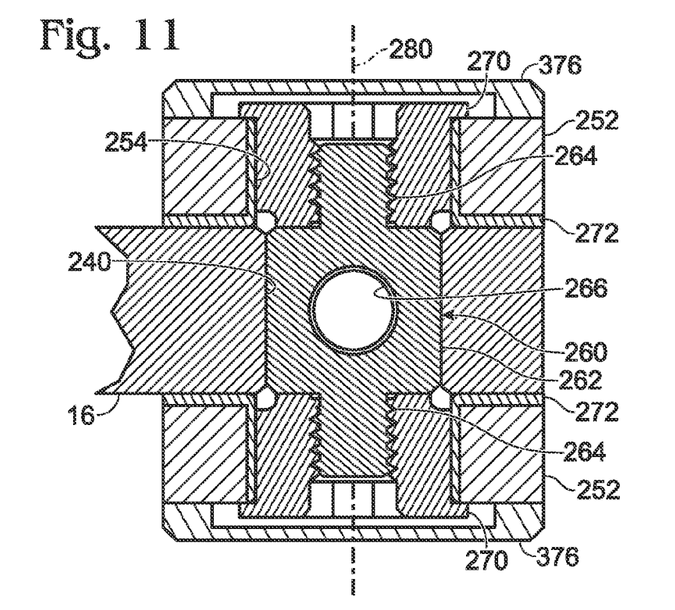
FIG. 11 is a cross-sectional, partial view of the supporting member, lever, and some of the components shown in FIG. 10, taken along the line 11-11 of FIG. 1.

Lever 18, at its proximal end, is pivotably coupled to the distal end of the supporting member 16 as follows. Lever 18 forms a grasping portion 250 at its distal end, with its proximal end forming a coextensive pair of parallel lug members 252, each including an elongated slot 254 running approximately along a longitudinal axis of the lever, and a bore 256 distal to the slot. Each of slots 254, and bores 256, are also coextensive with the other; as such, each pair may collectively be referred to herein as an elongated slot 254 and/or a bore 256. The lug members are sufficiently spaced from each other to accept the distal end of supporting member 16 therebetween. As can also be seen in FIG. 11, which represents a cross-section view of the mounting assembly, a pivot member 260 has a central body 262, with coaxial threaded portions 264 extending from opposing top and bottom surfaces thereof, and also includes a threaded transverse bore 266 through the body 262. Pivot member 260 is slidably captured within the elongated slot 240 formed in the supporting member 16 by means of a pair of nuts 270, each of which threadably receives one of the threaded portions 264 of the pivot member. In turn, each of nuts 270 is pivotally and coaxially received within a bushing 272. Nuts 270 each include a radial flange extending a distal face surface thereof, and bushings 272 also each include a radial flange extending a proximal face surface thereof. Each pair of respective flanges thus function to collectively couple the lug members of the lever 18 to the supporting member 16. The flanges also limit vertical movement of the pivot member, but allow pivotal movement of the pivot member, relative to the lever, about its own axis, which is also referred to herein as pivot axis 280, and slidable movement of the pivot member, relative to the lever, along the longitudinal axis of the elongated slot 254.

Thus, in the illustrated embodiment, the pivot axis 280 is adjustable relative to the lever when the pivot member slides along the longitudinal axis of the elongated slot 254.

The mechanical advantage, or leverage, of the lever 18, may therefore be adjusted by sliding the pivot member along this longitudinal axis. Assuming that the pivot axis 280 forms a fulcrum for the lever, the load is represented by the outward bias of the pivot member against the lever, against which force is applied. In terms of the effort needed to pivot the lever, such as by a user holding onto the handle of a motorcycle and pulling the lever toward the handle, comparatively more effort is required when the fulcrum is further away from the load (i.e., when the pivot member is at the distal end of the elongated slot 254), and less is required when the fulcrum is closer to the load (i.e., when the pivot member is at the proximal end of the elongated slot 254).

Figure 12:
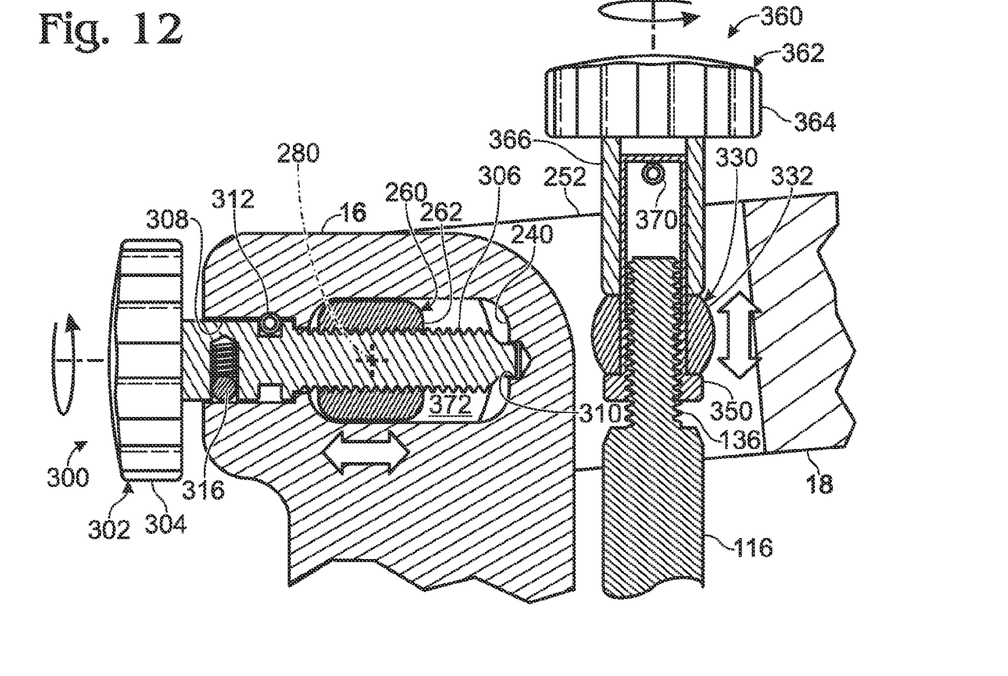
FIG. 12 is a cross-sectional, partial view of the supporting member, lever, and some of the components shown in FIG. 10, including a pivot adjustment mechanism and a stroke adjustment mechanism, taken along the line 12-12 of FIG. 1.

The illustrated embodiment of the master cylinder assembly 10 is provided with a pivot adjustment mechanism, generally indicated at 300, adapted to slide the pivot member along the longitudinal axis of the elongated slot 254 to thereby adjust the mechanical advantage of the lever. With reference to FIGS. 10 and 12, the pivot adjustment mechanism is shown to include a thumb screw 302 having a thumbwheel 304 and a stem 306 adapted to be rotatably inserted in a corresponding bore 308 in an exterior edge of the distal end of the supporting member 16, the bore 308 being coaxial with the longitudinal axis of the elongated slot 240 formed in the supporting member. An opposing surface of the interior wall of slot 240 includes a shallow bore 310 adapted to rotatably receive the distal end of the thumb screw stem 306. A pin 312 secures the thumb screw 302 in the supporting member via an annular groove in the stem near the thumbwheel, and a threaded portion of the stem is received in the threaded bore 266 of the pivot member 260. As shown in FIG. 12, operating the thumbwheel thus slides the pivot member in the elongated slot 254 (and also within the slot 240 in the supporting member), as shown by the horizontal arrow, which thereby adjusts the mechanical advantage of the lever.

The configuration of the elongated slot 254, and/or the components that support the pivot member for slidable movement therein, define a range of positions of the pivot axis, and therefore the range of mechanical advantage of the lever. Operating the thumbwheel 304 therefore allows a user to adjust the mechanical advantage of the lever by selecting a particular position of the pivot axis for pivotal operation of the lever. In particular, in the illustrated embodiment, thumbwheel 304 is disposed on the master cylinder assembly 10 for adjustment by the rider when the motorcycle is in use.

Although not required to all embodiments, the illustrated embodiment of the pivot adjustment mechanism 300 also includes an indexing mechanism in the form of a spring-biased ball bearing 316 received in a transverse bore in the stem near the thumbwheel. As the thumbwheel is turned, the ball bearing is urged into one of several longitudinal grooves (not shown) in the bore 308. This feature may allow a user to more easily set, and releasably retain, the pivot member within the slot at a desired position of the pivot axis.

The lever may be operably coupled to the piston member by any suitable means. In the illustrated embodiment, as shown in FIGS. 10 and 12, a stem member 330 includes a cylindrical body 332 with a cap 334 having a radially extending lip on the top end thereof, and a threaded lower end 336. Stem member is adapted to be pivotably (or hingedly) held within bore 256, with the threaded lower end received into a correspondingly threaded nut 340. The nut 340 also includes a radially extending lip on its bottom end that, together with the lip on the cap 334, restricts translational movement of the stem member relative to the bore, but allows pivotal movement thereof about the axis of the body 332.

The body 332 of the stem member also itself includes a transverse bore formed therethrough, positioned such that a piston sleeve 350 may be inserted therein, between lugs 252, when the stem member is pivotably held in bore 256. Piston sleeve 350 is also adapted to pivot, about its longitudinal axis, when inserted through the bore. Piston sleeve 350 also has a longitudinal bore, the interior surface thereof being adapted to threadably receive the threaded end 136 of the pivot rod 116.

Assembled, stem member 330 is adapted to translate pivotal movement of the lever, such as when the lever is pulled toward the handle by a user, into a pushing force exerted on the piston rod to operate the piston member.

The threaded connection between the piston sleeve and the piston rod allows adjustment of the position of the stem member relative to the piston rod. Thus, because the master cylinder assembly includes a biasing member in the form of spring 120 that urges the piston shaft 114 outward against the piston stop 140, the lever is in turn urged, via the stem member, into a corresponding rest position relative to the cylinder body, and therefore to a handle to which the cylinder body is mounted. The rest position of the lever is sometimes also referred to as the start position of the lever. Adjustment of the position of the stem member relative to the piston rod therefore adjusts the start position of the lever relative to the handle, and thus the lever stroke.

The illustrated embodiment of the master cylinder assembly 10 is provided with a stroke adjustment mechanism, generally indicated at 360, adapted to slide the stem member 330 relative to the piston rod 116 to thereby adjust the start position of the lever. A comparatively larger stroke, such as when the start position of the lever is further away from the handle, results in a greater extent of travel of the pistons within their respective pressure chambers, and a correspondingly greater volume of hydraulic fluid transferred from the cylinder body when the lever is pulled. A comparatively smaller stroke, such as when the start position of the lever is closer to the handle, results in a lesser extent of piston travel and, correspondingly, a lower volume of hydraulic fluid transfer.

The stroke adjustment mechanism in FIGS. 10 and 12 is shown a thumb screw 362 having a thumbwheel 364 and a stem 366 having a longitudinal bore formed therein, and sized to receive and nonrotatably retain, via a pin 370, piston sleeve 350. As shown in FIG. 12, operating the thumbwheel thus moves the stem member along the piston rod.

The configuration of the piston sleeve 350, and the length of the threaded portion 136 of the piston rod 116, define a range of positions of the stem member 330 along the piston rod, and therefore a range of start positions of the lever. Operating the thumbwheel 364 therefore allows a user to adjust the lever stroke by placing the stem member 330 in a desired position on the piston rod. In particular, in the illustrated embodiment, thumbwheel 364 is disposed on the master cylinder assembly 10 for adjustment by the rider when the motorcycle is in use.

Although not required to all embodiments, the illustrated embodiment of the stroke adjustment mechanism 360 also includes an indexing mechanism in the form of a spring-biased ball bearing 372 received in a bore (not shown) that extends upwardly into the body 332 of the stem member. As the thumbweel 364 is turned, the ball bearing is urged into one of several longitudinal grooves 374 on the exterior suface of the piston sleeve. This feature may allow a user to more easily set, and releasably retain, the stem member at a desired position on the piston rod.

The illustrated embodiment further includes a pair of lever caps 376 adapted to be fastened to the outer surfaces of the lugs 252, for example to protect the various mounting components discussed above from damage.

Although the present invention has been shown and described with reference to the foregoing operational principles and illustrated examples and embodiments, it will be apparent to those skilled in the art that various changes in form and detail may be made without departing from the spirit and scope of the invention. The present invention is intended to embrace all such alternatives, modifications and variances that fall within the scope of the appended claims.

I claim:

1. A master cylinder assembly comprising:
a cylinder body having an inlet port and an outlet port, and defining a cylinder chamber adapted to communicate via the inlet port with a fluid reservoir and to hold hydraulic fluid supplied therefrom, the cylinder chamber including two or more pressure chambers each having a transfer port;
a piston member fitted for slidable movement within the cylinder chamber, the piston member including two or more pistons received in respective pressure chambers, and being operable to move the pistons, in parallel, to thereby transfer hydraulic fluid held therein through the respective transfer ports; and
a pressure valve assembly operable to selectively direct hydraulic fluid transferred through at least one transfer port out of the cylinder body through the outlet port, to establish a variable fluid output at the outlet port upon operation of the piston member.

2. The master cylinder assembly of claim 1, wherein:
the cylinder body further defines a valve chamber, which further includes at least one supply port communicating with the at least one transfer port, and a delivery port communicating with the outlet port; and
wherein the pressure valve assembly further includes:
a selector adapted to select one or more supply ports; and
a pressure valve seated within the valve chamber, the pressure valve operable to establish a passageway communicating the one or more selected supply ports with the delivery port.

3. The master cylinder assembly of claim 2, wherein:
the pistons include a main piston and one or more supplementary pistons;
the pressure chambers correspondingly include a main pressure chamber and one or more supplementary pressure chambers;
the transfer port of each supplementary pressure chamber is in fluid communication with the at least one supply port; and
the transfer port of the main pressure chamber is in fluid communication with the outlet port;
such that upon operation of the piston member, fluid transferred by the supplementary pistons corresponding to the one or more supply ports selected with the selector, together with fluid transferred by the main piston, is directed through the outlet port.

4. The master cylinder assembly of claim 3, wherein the selector is adapted to sequentially select one or more of the at least one supply port.

5. The master cylinder assembly of claim 3, wherein the selector is adapted to cumulatively select one or more of the at least one supply port, such that the variable fluid output directed through the outlet port upon operation of the piston member is within a fluid output range having a minimum fluid output corresponding to the fluid transferred only by the main piston when no supply ports are selected by the selector, and a maximum fluid output corresponding to the fluid transferred by the main piston together with all of the supplementary pistons when all of the at least one supply port are selected by the selector.

6. The master cylinder assembly of claim 5, wherein the selector is adapted to sequentially select one or more of the at least one supply port, such that the fluid output upon operation of the piston member incrementally increases upon sequential selection of the at least one supply port.

7. The master cylinder assembly of claim 3, wherein the main piston further includes:
a cylindrical piston shaft,
an elongate piston rod extending longitudinally and rearwardly therefrom, and
a flange extending radially from the piston shaft;
wherein the flange supports the one or more supplementary pistons to extend forwardly from the flange with each in a spaced relation to, and parallel to the axis of, the piston shaft.

8. The master cylinder assembly of claim 2, wherein the pressure valve assembly is further adapted to return hydraulic fluid transferred through any supply port not selected by the selector to the cylinder chamber.

9. The master cylinder assembly of claim 8, wherein the valve chamber further includes a return port communicating with the cylinder chamber, and wherein the pressure valve is further operable to establish a passageway communicating any supply port that is not selected by the selector with the return port.

10. The master cylinder assembly of claim 2, wherein the valve chamber includes a chamber floor, wherein the pressure valve further includes a valve member configured for slidable movement along the chamber floor and defining a sealed delivery volume relative thereto, and wherein the one or more supply ports and delivery port are disposed on the chamber floor relative to the valve member such that the delivery volume encompasses the delivery port and one or more selected supply ports.

11. The master cylinder assembly of claim 10, wherein the selector is operable to select one or more supply ports by slidably moving the valve member relative to the chamber floor so that the delivery volume encompasses the one or more selected supply ports, thereby establishing a passageway communicating the one or more selected supply ports with the delivery port.

12. The master cylinder assembly of claim 10, wherein the pressure valve assembly further includes an indexing mechanism adapted to releasably retain the valve member in one of a plurality of positions relative to the chamber floor, wherein in each position the delivery volume encompasses a different combination of one or more supply ports and the delivery port.

13. The master cylinder assembly of claim 1, further including mounting means for mounting the cylinder body in a fixed position relative to a handle, a supporting member extending from the cylinder body, and an elongate transverse lever mounted at its proximal end to the distal end of the supporting member for pivotal movement of the lever about a pivot axis relative to the handle;
   wherein the piston member further includes a piston rod with its proximal end operably fixed to at least one piston and its distal end extending outwardly from the cylinder body; and
   wherein the distal end of the piston rod is hingedly coupled to the lever at a point distal of the pivot axis, such that pivotal movement of the lever about the pivot axis exerts a pushing force to operate the piston member.

14. The master cylinder assembly of claim 13, wherein the distal end of the lever includes an elongated slot having a longitudinal axis, transverse to the pivot axis, formed therein, wherein the lever is pivotally mounted on the supporting arm via a pivot member that pivots on the pivot axis, the pivot member being slidably captured in the elongated slot, and further including a pivot adjustment mechanism adapted to slide the pivot member along the longitudinal axis to thereby adjust the mechanical advantage of the lever.

15. The master cylinder assembly of claim 14, wherein the pivot adjustment mechanism includes a thumbwheel adapted to be operated by a user and which is threadably coupled to the pivot member, and wherein operating the thumbwheel slides the pivot member within the elongated slot.

16. The master cylinder assembly of claim 14, wherein the elongated slot defines a range of movement of the pivot member relative to the lever, thereby correspondingly defining a range of mechanical advantage of the lever.

17. The master cylinder assembly of claim 13, further including:
   a stem member movably mounted on the distal end of the piston rod and hingedly coupling the lever thereto, thereby defining a start position of the lever relative to the handle, and such that the stem member translates pivotal movement of the lever from the start position toward the handle into a pushing force on the piston rod to operate the piston member;
   biasing means adapted to bias the lever toward the start position; and
   a stroke adjustment mechanism adapted to move the stem member relative to the piston rod to thereby adjust the start position of the lever.

18. The master cylinder assembly of claim 17, wherein the stroke adjustment mechanism includes a thumbwheel adapted to be operated by a user and which is threadably coupled to the stem member, and wherein operating the thumbwheel moves the stem member relative to the piston rod.

* * * * *